(12) United States Patent
Taylor

(10) Patent No.: US 7,190,677 B2
(45) Date of Patent: Mar. 13, 2007

(54) SYSTEM AND METHOD FOR MULTIPLE TEST ACCESS IN A COMMUNICATION NETWORK

(75) Inventor: William S Taylor, Duluth, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1211 days.

(21) Appl. No.: 10/136,080

(22) Filed: May 1, 2002

(65) Prior Publication Data

US 2003/0206529 A1 Nov. 6, 2003

(51) Int. Cl.
*G01R 31/08* (2006.01)
(52) U.S. Cl. .................. 370/241; 379/1.04; 340/2.28
(58) Field of Classification Search ............... None
See application file for complete search history.

(56) References Cited

U.S. PATENT DOCUMENTS 5,954,829 A * 9/1999 McLain et al. ............. 714/712
2004/0078717 A1 * 4/2004 Allred et al. ................. 714/43

* cited by examiner

*Primary Examiner*—Duc Ho
(74) *Attorney, Agent, or Firm*—Lee & Hayes, PLLC

(57) ABSTRACT

A method of providing multiple test access for test equipment in a communication network is provided. The method comprises the step of coupling test apparatus to a first communication line via a first communication circuit in the test apparatus wherein the first communication line has a first quantity of equal bandwidth communication pathways that are dedicated for test access. The first communication line is coupled to a first cross connect apparatus. The test apparatus also has a second communication circuit that is coupled to the first communication circuit. The method further comprises the step of utilizing a second communication line having a second quantity of equal bandwidth communication pathways that are dedicated for test access. The second communication line is coupled between the first cross connect apparatus and a second cross connect apparatus. The second quantity is less than the first quantity. The method further comprises the step of controlling the test apparatus to initiate a test procedure wherein the second communication circuit initiates a test of network facilities associated with the second cross connect apparatus.

48 Claims, 4 Drawing Sheets

SYSTEM AND METHOD FOR MULTIPLE TEST ACCESS IN A COMMUNICATION NETWORK

BACKGROUND

1. Field of the Invention

This invention relates generally to telecommunication networks. More particularly, the invention relates to a system and method for testing network elements in a telecommunications network.

2. Description of the Related Art

Many transport circuits, sub-circuits, and components in telecommunication networks are tested using test equipment such as the Actema T3AS test equipment. The test equipment can be controlled to provide test signals to test the functioning of physical or virtual communication channels serviced by a digital cross connect system ("DCS") to which the test equipment is coupled. The test equipment typically comprise a plurality of communication circuits wherein each communication circuit is used to communicate with a different DCS. Each communication circuit is directly coupled to a separate communication line that has multiple sub-lines such as a DS3 carrier having multiple T1 lines. When connected to a DS3 carrier, the communication circuits in the test equipment typically only utilize a small portion of the available T1 lines and as a result a large number of the available T1 lines are unused by each communication circuit.

SUMMARY

A method of providing multiple test access for test equipment in a communication network is provided. The method comprises the step of coupling test apparatus to a first communication line via a first communication circuit in the test apparatus wherein the first communication line has a first quantity of equal bandwidth communication pathways that are dedicated for test access. The first communication line is coupled to a first cross connect apparatus. The test apparatus also has a second communication circuit that is coupled to the first communication circuit. The method further comprises the step of utilizing a second communication line having a second quantity of equal bandwidth communication pathways that are dedicated for test access. The second communication line is coupled between the first cross connect apparatus and a second cross connect apparatus. The second quantity is less than the first quantity. The method further comprises the step of controlling the test apparatus to initiate a test procedure wherein the second communication circuit initiates a test of network facilities associated with the second cross connect apparatus.

In accordance with another aspect of the invention described by the claims, a test apparatus for use in a communication network having a plurality of cross connect apparatus is provided. The test apparatus comprises a first communication circuit and a second communication circuit. The first communication circuit has an associated first communication port. The first port is capable of coupling with a communication line having multiple communication pathways. The test apparatus is controllable to test a first transport circuit in the communication network that is accessible via a first cross connect apparatus. The first cross connect apparatus is accessible via the first port and a first communication line having a first quantity of equal bandwidth communication pathways that are dedicated for test access. The first communication line is coupled between the first cross connect apparatus and the first port.

The second communication circuit has an associated second communication port. The second port is capable of coupling with a communication line having multiple communication pathways. The test apparatus is controllable to test a second transport circuit in the communication network that is accessible via a second cross connect apparatus. The second cross connect apparatus is accessible via the second port and a second communication line having a second quantity of equal bandwidth communication pathways that are dedicated for test access. The second communication line is coupled between the first cross connect apparatus and the second cross connect apparatus. The second quantity is less than the first quantity. The second port is coupled to an input of the first communication circuit. Some of the first quantity of equal bandwidth communication pathways are used by the second port and second communication circuit in connection with the testing of the second transport circuit.

In accordance with another aspect of the invention defined by the claims, a communication network is provided. The communication network comprises a first cross connect apparatus, a second cross connect apparatus, a first communication line, a second communication line, and a test apparatus. The first communication line has a first quantity of equal bandwidth communication pathways that are dedicated for test access. The first communication line is coupled at one end to the first cross connect apparatus. The second communication line has a second quantity of equal bandwidth communication pathways that are dedicated for test access. The second communication line is coupled between the first cross connect apparatus and the second cross connect apparatus. The second quantity is less than the first quantity.

The test apparatus has a first communication circuit with a first communication port and a second communication circuit with a second communication port. Each of the first and second ports are capable of coupling with a communication line having multiple communication pathways. The test apparatus is controllable to test a first transport circuit that is accessible via the first cross connect apparatus. The first cross connect apparatus is accessible via the first port. The test apparatus is also controllable to test a second transport circuit that is accessible via the second cross connect apparatus. The second cross connect apparatus is accessible via the second port. The first port is coupled to the first communication line and the second port is coupled to an input of the first communication circuit. Some of the first quantity of equal bandwidth communication pathways are used in connection with the testing of the second transport circuit.

BRIEF DESCRIPTION OF THE DRAWINGS

In order that the invention identified in the claims may be more clearly understood, preferred embodiments of structures, systems and methods having elements corresponding to elements of the invention recited in the claims will be described in detail by way of example, with reference to the accompanying drawings, in which:

DETAILED DESCRIPTION

Figure 1:
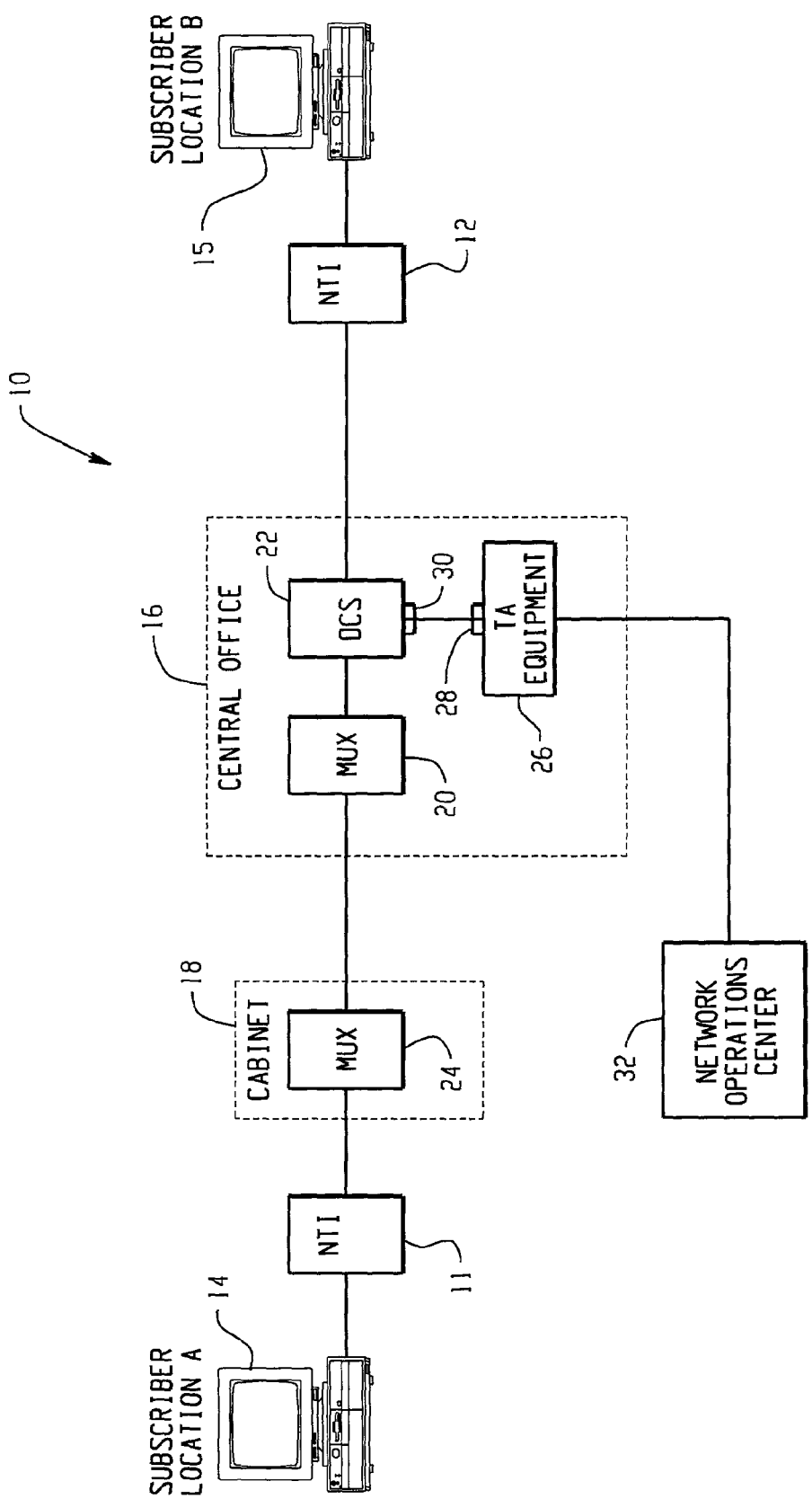
FIG. 1 is a schematic diagram of an exemplary section of a Local Access and Transport Area network having test access equipment.

Referring now to the drawings, shown in FIG. 1 is an exemplary section of a Local Access and Transport Area ("LATA") network 10 that provides a transport circuit for communication between two locations, subscriber location A and subscriber location B. In the illustrated example, the transport circuit provides a subscriber at subscriber location A with a first subscriber network termination interface ("NTI") 11 and a subscriber at subscriber location B with a second subscriber NTI 12. Coupled to each NTI 11, 12, a subscriber may have various types of customer premises equipment ("CPE") 14, 15 such as conventional telephones, facsimile machines, private branch exchanges, voice mail systems, key telephone systems, computers, modems, telephone answering machines, alarm systems, and radio control systems, as well as many other devices.

Coupled between each NTI 11, 12 in the exemplary LATA network section 10, are a central office ("CO") 16 and a field cabinet 18, each of which includes various types of network elements for allowing the CPE 14, 15 at each end of the LATA network section 10 to communicate with each other and other CPE (not shown). Examples of network elements located at the CO 16 include Multiplexers ("MUXs") 20, digital cross-connect systems ("DCS") 22, and other equipment. Examples of network elements that may reside in the cabinet 18 include coder/decoder (codec) equipment, multiplexers ("MUXs") 24, line interface units ("LIUs"), Optical network units ("ONUs"), digital loop carrier ("DLC") equipment, HDSL Line Units ("HLUs"), HDSL Remote Units ("HRUs"), and others.

To test the various components and sub-circuits that cooperate to form the LATA network section 10 between the CPE 14, 15 at each end of the network section, test access ("TA") equipment 26 is provided. An exemplary test access equipment model is the Acterna T3A3 test access equipment. Other test access equipment exists. The TA equipment 26 comprises a number of elements including one or more communication ports 28. Preferably the communication ports 28 are facility access digroup ("FAD") interfaces or ports 28 that can be coupled to a FAD interface or port 30 on a DCS 22. Alternatively, the communication ports 28 could be test access digroup ("TAD") interfaces or ports or other types of interfaces or ports that can be coupled to a TAD interface or port 30 on a DCS 22 or other type of port on a DCS. The TA equipment 26 can be controlled, preferably from a network operations center 32, to provide test signals to test the functioning of each physical or virtual communication channel or transport circuit serviced by the DCS 22 to which the TA equipment 26 is coupled via the communication port 28. The TA equipment 26, for example, can test the end-to-end functioning of the LATA network section 10 between the NTIs 11, 12 at either end of the LATA network section 10.

Figure 2:
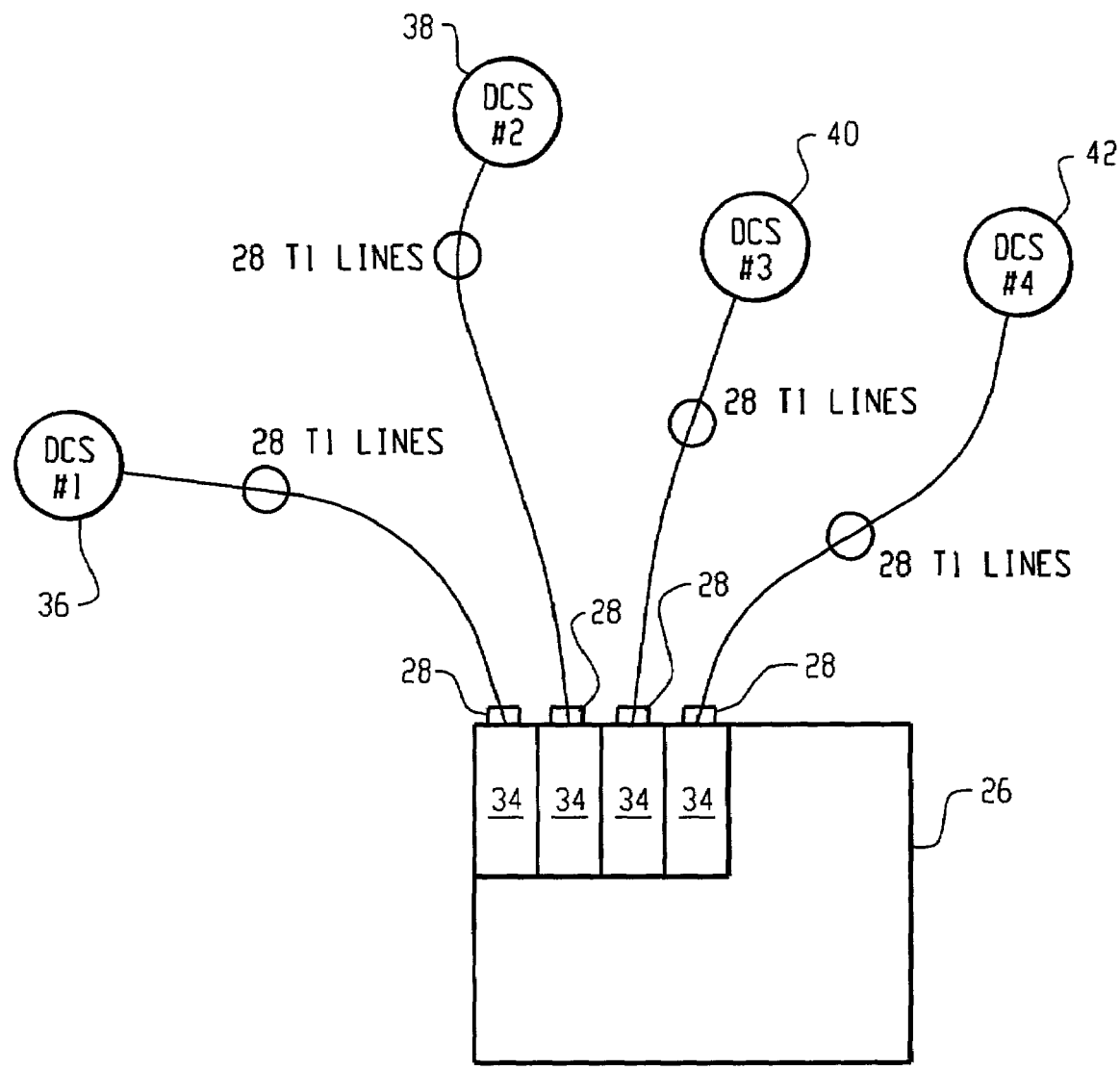
FIG. 2 is a block diagram illustrating a current way of connecting test access equipment to multiple DCSs in a telecommunication network.

As illustrated in FIG. 2, the TA equipment 26 preferably comprises a plurality of communication circuits 34, which preferably are FAD or TAD circuits, each having a communication port 28, which preferably is a FAD or TAD port, for coupling to a different DCS 36, 38, 40, 42. A separate communication circuit 34 is needed to test transport circuits serviced by each DCS. Each communication circuit 34 is typically used to test the transport circuits serviced by a single DCS. To provide the TA equipment 26 with the capability of interfacing with and testing the transport circuits serviced by multiple DCSs, multiple communication circuits 34 are typically provided.

To test various transport circuits serviced by a DCS, it is often necessary to conduct a number of tests simultaneously. Each test typically requires the use of a separate pair of communication pathways (one transmit and one receive pathway). Therefore to perform the multiple simultaneous tests, multiple pairs of communication pathways are needed to couple the TA equipment 26 to the DCS.

Commonly, DS3 lines are used to couple the TA equipment to the DCS because a DS3 line contains multiple DS1 or T1 communication pathways. Consequently, the communication circuits 34 provided in the TA equipment 26 are commonly DS3 communications circuits that are capable of coupling to and communicating over DS2 lines. A DS3 line contains the equivalent of 28 T1 lines and therefore can provide 14 pairs of communication pathways (each pair comprising one transmit and one receive pathway) between a communication circuit 34 and a DCS.

In actual usage, the maximum number of simultaneous test that are conducted at any one time in connection with a single DCS is four (4). Therefore, a communication or FAD circuit 34 is not known to use more than 4 pairs of (or 8 total DS1) communication pathways at a given time. Consequently, 10 pairs of communication pathways or 20 T1 lines are not utilized if a DS3 line and a DS3 communication circuit is used with the TA equipment. A DCS, therefore, must dedicate 20 T1 lines to the TA equipment 26 that go unused. The DCS cannot use those 20 unused T1 lines to support paying customers.

Figure 3:
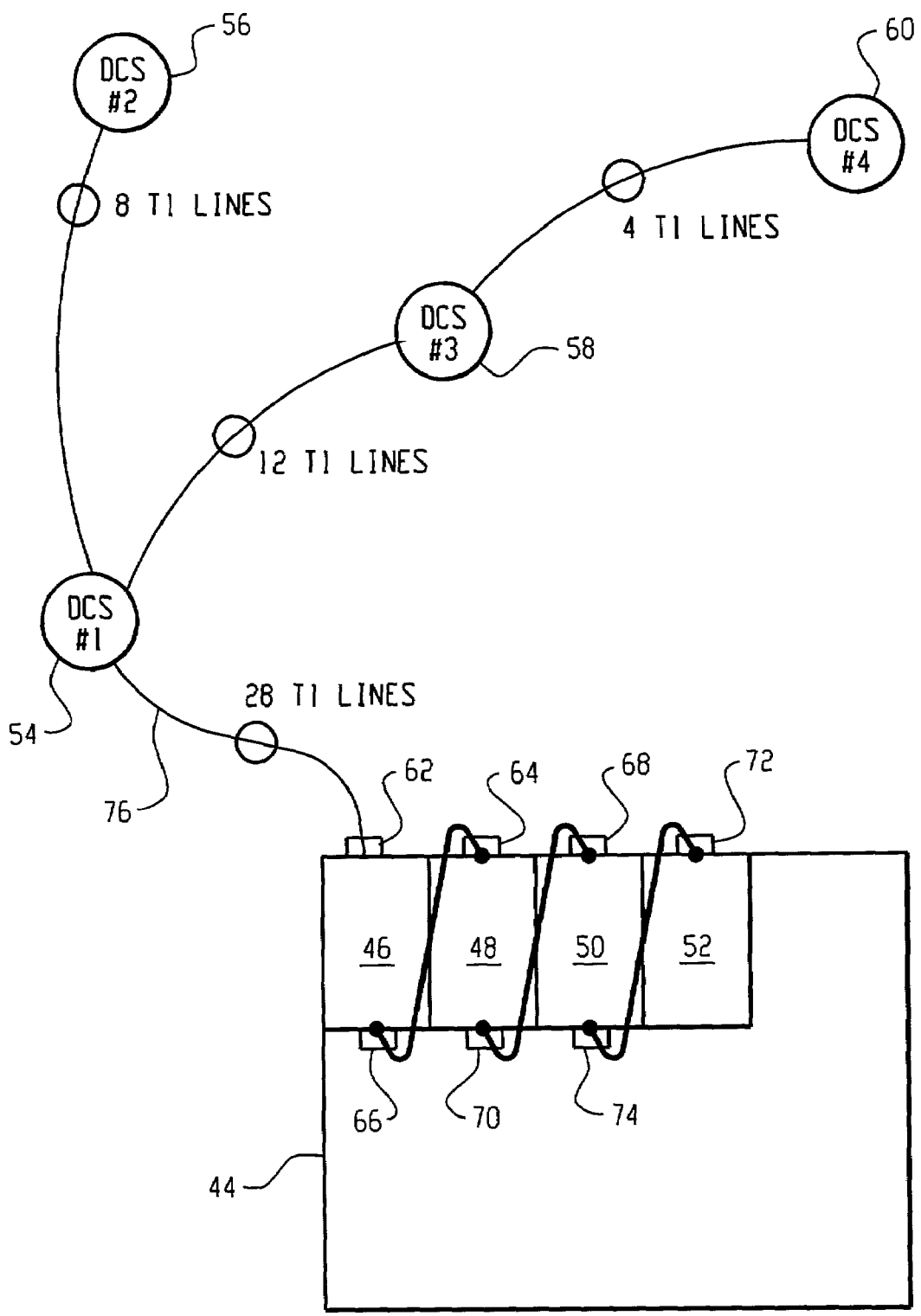
FIG. 3 is a block diagram illustrating a preferred way of connecting test access equipment to multiple DCSs in a telecommunication network.

A preferred TA equipment 44 arrangement is illustrated in FIG. 3. The exemplary TA equipment 44, is equipped with 4 FAD circuits 46, 48, 50, 52 for providing testing functions to transport circuits associated with 4 different DCSs 54, 56, 58, 60, wherein one FAD circuit is associated with each DCS 54, 56, 58, 60. The TA equipment 44, however, could be equipped with fewer or more communication circuits.

In the illustrated example, the FAD circuits 46, 48, 50, 52 are daisy chained together. The upstream FAD port 62 of the first FAD circuit 46 is coupled to a DS3 line connected to DCS #1 54. The upstream FAD port 64 of a second FAD circuit 48 is coupled to the downstream FAD port 66 of the first FAD circuit 46. The upstream FAD port 68 of a third FAD circuit 50 is coupled to the downstream FAD port 70 of the second FAD circuit 48. The upstream FAD port 72 of a fourth FAD circuit 52 is coupled to the downstream FAD port 74 of the third FAD circuit 50. This arrangement allows the FAD circuits 46, 48, 50, 52 to share a common DS3 line 76 to DCS #1 54.

Each FAD circuits 46, 48, 50, 52 can use some of the T1 lines associated with the common DS3 line 76. The FAD circuits can gain access to their associated DCS through T1 lines that interconnect the DCSs in the network. As a result of the new arrangement, the total number of dedicated, unused T1 lines in the network can be reduced. The first DCS 54 continues to dedicate a DS3 line to the TA equipment 44. But, the remaining DCSs 56, 58, 60 do not have to dedicate a DS3 line. These DCSs 56, 58, 60 can dedicate fewer T1 lines and have more T1 lines available to use with paying customers.

Figure 4:
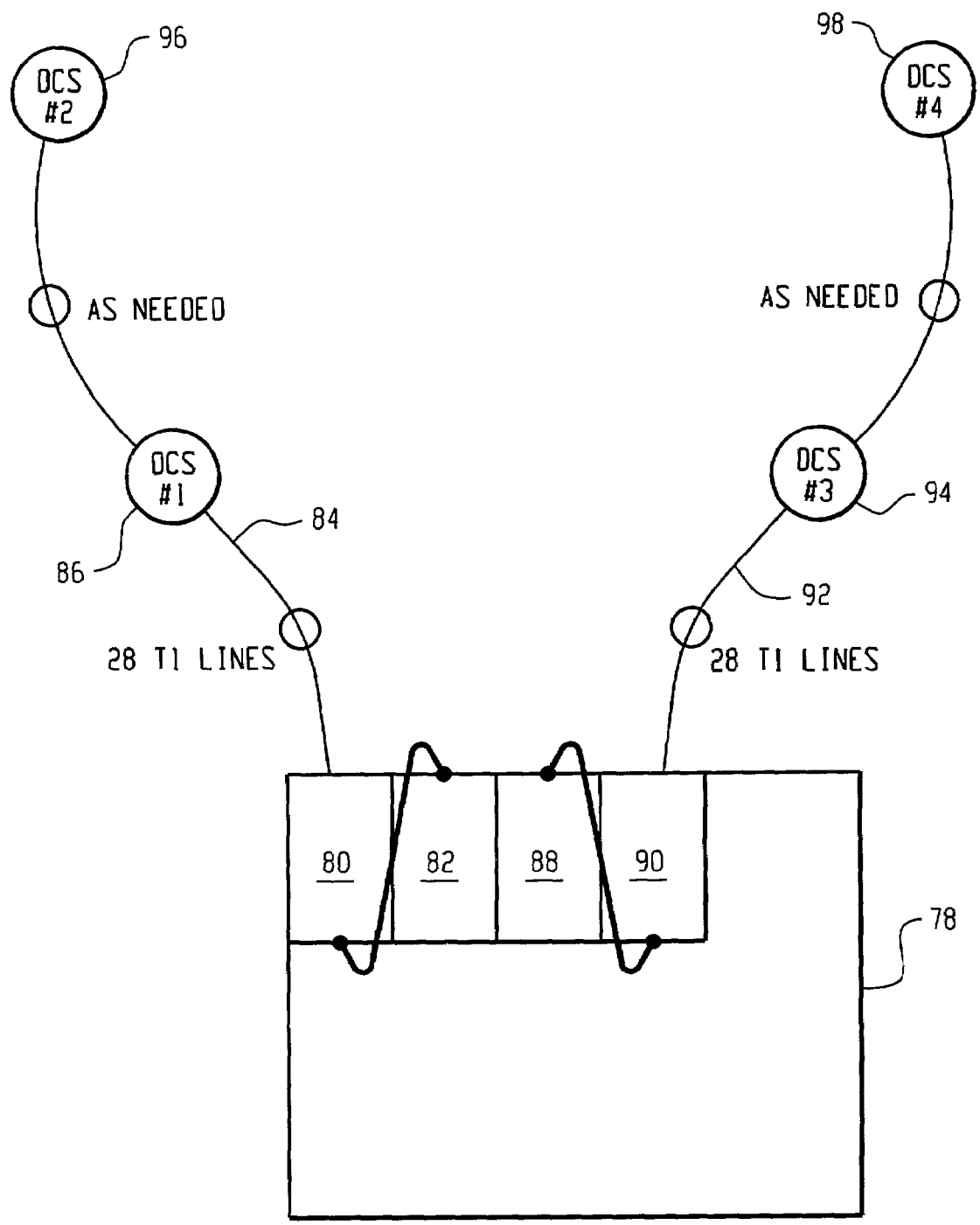
FIG. 4 is a block diagram illustrating another exemplary way of connecting test access equipment to multiple DCSs in a telecommunication network.

Illustrated in FIG. 4 is another improved TA equipment 78 arrangement. In this example, the first two FAD circuits 80, 82 are coupled together and share a first common DS3 line 84 to a first DCS 86. The next two FAD circuits 88, 90 are coupled together and share a second common DS3 line 92 to a third DCS 94. In this arrangement, the second FAD circuit 82 can gain access to the second DCS 96 through the first common DS3 line 84 and the first DCS 86. The third FAD circuit 88 can gain access to the fourth DCS 98 through the second common DS3 line 92 and the third DCS 94. In this arrangement, the first and third DCSs 86 and 94 must each dedicate a DS3 line to the TA equipment 78. But, the second and fourth DCSs only need to dedicate T1 lines as needed.

Theses are just a few examples of improved TA equipment arrangements. Other variations from these systems and methods should become apparent to one of ordinary skill in the art without departing from the scope of the invention defined by the claims. The embodiments have been described herein with reference to a LATA network but are also applicable to other types of networks such as a frame relay network. The embodiments have been described herein with reference to a FAD circuit and FAD port but are also applicable to other types of communication circuits and ports such as a TAD circuit and a TAD port.

The embodiments described herein and shown in the drawings are examples of structures, systems or methods having elements corresponding to the elements of the invention recited in the claims. This written description and drawings may enable those skilled in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention is claimed is:

1. A test apparatus for use in a communication network having a plurality of cross connect apparatus, the test apparatus comprising:
    a first FAD (Facility Access Digroup) circuit coupled with a first communication line that is coupled to a first cross connect apparatus, the first communication line having a first quantity of equal bandwidth communication pathways that are dedicated for test access; and
    a second FAD circuit that coupled to the first FAD circuit, the second FAD circuit communicating with a second cross connect apparatus that is coupled to the first cross connect apparatus by a second communication line having a second quantity of equal bandwidth communication pathways that are dedicated for test access, wherein the second quantity is less than the first quantity, the second FAD circuit communicating with the second cross connect apparatus using some of the first quantity of equal bandwidth communication pathways; and
    the test apparatus initiates a test sequence enables the second FAD circuit initiates a test of transport circuits associated with said second cross connect apparatus.

2. The test apparatus of claim 1 wherein the second FAD circuit is coupled to the first FAD circuit.

3. The test apparatus of claim 2 further comprising a third FAD circuit, the third FAD circuit being coupled to the second FAD circuit, the third FAD circuit communicating with a third cross connect apparatus that is coupled to either the first cross connect apparatus or the second cross connect apparatus by a third communication line having a third quantity of equal bandwidth communication pathways that are dedicated for test access, wherein the third quantity is less than the first quantity, the third FAD circuit communicating with the third cross connect apparatus using some of the first quantity of equal bandwidth communication pathways, and wherein the test apparatus initiates a test sequence wherein the third FAD circuit initiates a test of transport circuits associated with said third cross connect apparatus.

4. The test apparatus of claim 3 wherein the first FAD circuit, the second FAD circuit and the third FAD circuit are DS3 FAD circuits.

5. The test apparatus of claim 1 wherein the first FAD circuit is a DS3 FAD circuit.

6. The test apparatus of claim 5 wherein the second FAD circuit is a DS3 FAD circuit.

7. A test apparatus for use in a communication network having a plurality of cross connect apparatus, the test apparatus comprising:
    a first TAD (Test Access Digroup) circuit coupled with a first communication line that is coupled to a first cross connect apparatus, the first communication line having a first quantity of equal bandwidth communication pathways that are dedicated for test access; and
    a second TAD circuit that coupled to the first TAD circuit, the second TAD circuit communicates with a second cross connect apparatus that is coupled to the first cross connect apparatus by a second communication line having a second quantity of equal bandwidth communication pathways that are dedicated for test access, wherein the second quantity is less than the first quantity, the second TAD circuit being operable to communicate with the second cross connect apparatus using some of the first quantity of equal bandwidth communication pathways; and
    the test apparatus initiates a test sequence enables the second TAD circuit initiates a test of transport circuits associated with said second cross connect apparatus.

8. The test apparatus of claim 7 wherein the second TAD circuit is coupled to the first TAD circuit.

9. The test apparatus of claim 8 further comprising a third TAD circuit, the third TAD circuit being coupled to the second TAD circuit, the third TAD circuit communicates with a third cross connect apparatus that is coupled to either the first cross connect apparatus or the second cross connect apparatus by a third communication line having a third quantity of equal bandwidth communication pathways that are dedicated for test access, wherein the third quantity is less than the first quantity, the third TAD circuit communicates with the third cross connect apparatus using some of the first quantity of equal bandwidth communication pathways, and wherein the test apparatus initiates a test sequence wherein the third TAD circuit initiates a test of transport circuits associated with said third cross connect apparatus.

10. The test apparatus of claim 9 wherein the first TAD circuit, the second TAD circuit and the third TAD circuit are DS3 TAD circuits.

11. The test apparatus of claim 7 wherein the first TAD circuit is a DS3 TAD circuit.

12. The test apparatus of claim 11 wherein the second TAD circuit is a DS3 TAD circuit.

13. A test apparatus for use in a communication network having a plurality of cross connect apparatus, the test apparatus comprising:
    a first communication circuit having a first communication port, the first port being capable of coupling with a communication line having multiple communication pathways, the test apparatus tests a first transport circuit in the communication network that is accessible via a first cross connect apparatus, wherein the first cross connect apparatus is accessible via the first port and a first communication line having a first quantity of equal bandwidth communication pathways that are dedicated for test access, the first communication line being coupled between the first cross connect apparatus and the first port;

a second communication circuit with a second communication port, the second port coupled with a communication line having multiple communication pathways, the test apparatus tests a second transport circuit in the communication network that is accessible via a second cross connect apparatus, wherein the second cross connect apparatus is accessible via the second port and a second communication line having a second quantity of equal bandwidth communication pathways that are dedicated for test access, the second communication line being coupled between the first cross connect apparatus and the second cross connect apparatus, and wherein the second quantity is less than the first quantity, wherein the second port is coupled to an input of the first communication circuit, and wherein some of the first quantity of equal bandwidth communication pathways are used by the second port and second communication circuit in connection with the testing of the second transport circuit.

14. The apparatus of claim 13 wherein the first port is a DS3 port.

15. The apparatus of claim 14 wherein the second port is a DS3 port.

16. The test apparatus of claim 13 further comprising a third communication circuit with a third communication port, the third port coupled with a communication line having multiple communication pathways, the test apparatus tests a third transport circuit in the communication network that is accessible via a third cross connect apparatus, wherein the third cross connect apparatus is accessible via the third port and a third communication line having a third quantity of equal bandwidth communication pathways that are dedicated for test access, the third communication line being coupled between either the first cross connect apparatus or the second cross connect apparatus and the third cross connect apparatus, and wherein the third quantity is less than the first quantity, wherein the third port is coupled to an input of the second communication circuit, and wherein some of the first quantity of equal bandwidth communication pathways are used by the third port and third communication circuit in connection with the testing of the third transport circuit.

17. The apparatus of claim 16 wherein the first port, the second port, and the third port are DS3 ports.

18. A communication network comprising:
a first cross connect apparatus and a second cross connect apparatus;
a first communication line coupled to the first cross connect apparatus and having a first quantity of equal bandwidth communication pathways that are dedicated for test access;
a second communication line coupled between the first cross connect apparatus and the second cross connect apparatus and having a second quantity of equal bandwidth communication pathways that are dedicated for test access, the second quantity being less than the first quantity;
a test apparatus having a first FAD (Facility Access Digroup) circuit and a second FAD circuit, the first FAD circuit being coupled to the first communication line, the second FAD circuit being coupled to the first FAD circuit, the test apparatus initiates a test sequence enables the second FAD circuit initiates a test of transport circuits associated with said second cross connect apparatus.

19. The network according to claim 18 wherein some of the first quantity of equal bandwidth communication pathways are used in connection with the first FAD circuit and some of the first quantity of equal bandwidth communication pathways are used in connection with the second FAD circuit.

20. The network according to claim 18 wherein the first FAD circuits is a DS3 FAD circuit.

21. The network according to claim 18 wherein the first and second FAD circuits are DS3 FAD circuits.

22. The network according to claim 18 further comprising a third FAD circuit in the test apparatus, a fourth FAD circuit in the test apparatus, a third cross connect apparatus, a fourth cross connect apparatus, a third communication line having a third quantity of equal bandwidth communication pathways that are dedicated for test access and that are coupled to the third cross connect apparatus, and a fourth communication line having a fourth quantity of equal bandwidth communication pathways that are dedicated for test access and that are coupled to the fourth cross connect apparatus, wherein the fourth quantity is less than the first quantity.

23. The network according to claim 22 wherein the third communication line is coupled to the third FAD circuit and the fourth FAD circuit is coupled to the third FAD circuit, the fourth communication line being coupled to the third cross connect apparatus, the test apparatus initiates a test sequence wherein the fourth FAD circuit initiates a test of transport circuits associated with said fourth cross connect apparatus and wherein some of the third quantity of equal bandwidth communication pathways are used in connection with the fourth FAD circuit.

24. The network according to claim 22 wherein the third communication line is coupled to the second cross connect apparatus, the third FAD circuit being coupled to the second FAD circuit, the fourth FAD circuit being coupled to the third FAD circuit, wherein the third quantity and the fourth quantity are less than the first quantity, the test apparatus initiates a test sequence wherein the third FAD circuit initiates a test of transport circuits associated with said third cross connect apparatus, and wherein some of the first quantity of equal bandwidth communication pathways are used in connection with the third FAD circuit.

25. The network according to claim 24 wherein the fourth communication line is coupled to the third cross connect apparatus, the test apparatus initiates a test sequence wherein the fourth FAD circuit initiates a test of transport circuits associated with said fourth cross connect apparatus, and wherein some of the first quantity of equal bandwidth communication pathways are used in connection with the fourth FAD circuit.

26. The network according to claim 24 wherein the fourth communication line is coupled to the second cross connect apparatus, the test apparatus initiates a test sequence wherein the fourth FAD circuit initiates a test of transport circuits associated with said fourth cross connect apparatus, and wherein some of the first quantity of equal bandwidth communication pathways are used in connection with the fourth FAD circuit.

27. A communication network comprising:
a first cross connect apparatus and a second cross connect apparatus;

a first communication line coupled to the first cross connect apparatus and having a first quantity of equal bandwidth communication pathways that are dedicated for test access;

a second communication line coupled between the first cross connect apparatus and the second cross connect apparatus and having a second quantity of equal bandwidth communication pathways that are dedicated for test access, the second quantity being less than the first quantity;

a test apparatus having a first TAD (Test Access Digroup) circuit and a second TAD circuit, the first TAD circuit being coupled to the first communication line, the second TAD circuit being coupled to the first TAD circuit, the test apparatus initiates a test sequence enables the second TAD circuit initiates a test of transport circuits associated with said second cross connect apparatus.

28. The network according to claim 27 wherein some of the first quantity of equal bandwidth communication pathways are used in connection with the first TAD circuit and some of the first quantity of equal bandwidth communication pathways are used in connection with the second TAD circuit.

29. The network according to claim 27 wherein the first TAD circuits is a DS3 TAD circuit.

30. The network according to claim 27 wherein the first and second TAD circuits are DS3 TAD circuits.

31. The network according to claim 27 further comprising a third TAD circuit in the test apparatus, a fourth TAD circuit in the test apparatus, a third cross connect apparatus, a fourth cross connect apparatus, a third communication line having a third quantity of equal bandwidth communication pathways that are dedicated for test access and that are coupled to the third cross connect apparatus, and a fourth communication line having a fourth quantity of equal bandwidth communication pathways that are dedicated for test access and that are coupled to the fourth cross connect apparatus, wherein the fourth quantity is less than the first quantity.

32. The network according to claim 31 wherein the third communication line is coupled to the third TAD circuit and the fourth TAD circuit is coupled to the third TAD circuit, the fourth communication line being coupled to the third cross connect apparatus, the test apparatus initiates a test sequence wherein the fourth TAD circuit initiates a test of transport circuits associated with said fourth cross connect apparatus and wherein some of the third quantity of equal bandwidth communication pathways are used in connection with the fourth TAD circuit.

33. The network according to claim 31 wherein the third communication line is coupled to the second cross connect apparatus, the third TAD circuit being coupled to the second TAD circuit, the fourth TAD circuit being coupled to the third TAD circuit, wherein the third quantity and the fourth quantity are less than the first quantity, the test apparatus initiates a test sequence wherein the third TAD circuit initiates a test of transport circuits associated with said third cross connect apparatus, and wherein some of the first quantity of equal bandwidth communication pathways are used in connection with the third TAD circuit.

34. The network according to claim 33 wherein the fourth communication line is coupled to the third cross connect apparatus, the test apparatus initiates a test sequence wherein the fourth TAD circuit initiates a test of transport circuits associated with said fourth cross connect apparatus, and wherein some of the first quantity of equal bandwidth communication pathways are used in connection with the fourth TAD circuit.

35. The network according to claim 33 wherein the fourth communication line is coupled to the second cross connect apparatus, the test apparatus initiates a test sequence wherein the fourth TAD circuit initiates a test of transport circuits associated with said fourth cross connect apparatus, and wherein some of the first quantity of equal bandwidth communication pathways are used in connection with the fourth TAD circuit.

36. A communication network comprising:
a first cross connect apparatus and a second cross connect apparatus;
a first communication line having a first quantity of equal bandwidth communication pathways that are dedicated for test access, the first communication line being coupled at one end to the first cross connect apparatus;
a second communication line having a second quantity of equal bandwidth communication pathways that are dedicated for test access, the second communication line being coupled between the first cross connect apparatus and the second cross connect apparatus, and wherein the second quantity is less than the first quantity; and
a test apparatus having a first communication circuit with a first communication port and a second communication circuit with a second communication port, each of the first and second ports coupled with a communication line having multiple communication pathways, the test apparatus tests a first transport circuit that is accessible via the first cross connect apparatus, the first cross connect apparatus being accessible via the first port, the test apparatus also being controllable to test a second transport circuit that is accessible via the second cross connect apparatus, the second cross connect apparatus being accessible via the second port, wherein the first port is coupled to the first communication line and the second port is coupled to an input of the first communication circuit, and wherein some of the first quantity of equal bandwidth communication pathways are used in connection with the testing of the second transport circuit.

37. A method of providing multiple test access for test equipment in a communication network, comprising the steps of:
coupling a test apparatus to a first communication line via a first FAD (Facility Access Digroup) circuit in the test apparatus, the first communication line having a first quantity of equal bandwidth communication pathways that are dedicated for test access, the first communication line being coupled to a first cross connect apparatus, the test apparatus also having a second FAD circuit that is coupled to the first FAD circuit;
utilizing a second communication line having a second quantity of equal bandwidth communication pathways that are dedicated for test access, the second communication line being coupled between the first cross connect apparatus and a second cross connect apparatus, the second quantity being less than the first quantity; and
controlling the test apparatus to initiate a test procedure enables the second FAD circuit initiates a test of transport circuits associated with the second cross connect apparatus.

38. The method according to claim 37 wherein some of the first quantity of equal bandwidth communication pathways are used in connection with the first FAD circuit and some of the first quantity of equal bandwidth communication pathways are used in connection with the second FAD circuit.

39. The method according to claim 37 wherein the first FAD circuit is a DS3 FAD circuit.

40. The method according to claim 37 wherein the first and second FAD circuits are DS3 FAD circuits.

41. A method of providing multiple test access for test equipment in a communication network, comprising the steps of:

coupling a test apparatus to a first communication line via a first TAD (Test Access Digroup) circuit in the test apparatus, the first communication line having a first quantity of equal bandwidth communication pathways that are dedicated for test access, the first communication line being coupled to a first cross connect apparatus, the test apparatus also having a second TAD circuit that is coupled to the first TAD circuit;

utilizing a second communication line having a second quantity of equal bandwidth communication pathways that are dedicated for test access, the second communication line being coupled between the first cross connect apparatus and a second cross connect apparatus, the second quantity being less than the first quantity; and controlling the test apparatus to initiate a test procedure enables the second TAD circuit initiates a test of transport circuits associated with the second cross connect apparatus.

42. The method according to claim 41 wherein some of the first quantity of equal bandwidth communication pathways are used in connection with the first TAD circuit and some of the first quantity of equal bandwidth communication pathways are used in connection with the second TAD circuit.

43. The method according to claim 41 wherein the first TAD circuit is a DS3 TAD circuit.

44. The method according to claim 41 wherein the first and second TAD circuits are DS3 TAD circuits.

45. A method of providing multiple test access for test equipment in a communication network, comprising the steps of:

coupling a test apparatus to a first communication line via a first communication circuit in the test apparatus, the first communication line having a first quantity of equal bandwidth communication pathways that are dedicated for test access, the first communication line being coupled to a first cross connect apparatus, the test apparatus also having a second communication circuit that is coupled to the first communication circuit;

utilizing a second communication line having a second quantity of equal bandwidth communication pathways that are dedicated for test access, the second communication line being coupled between the first cross connect apparatus and a second cross connect apparatus, the second quantity being less than the first quantity; and controlling the test apparatus to initiate a test procedure enables the second communication circuit initiates a test of network facilities associated with the second cross connect apparatus.

46. The method according to claim 45 wherein some of the first quantity of equal bandwidth communication pathways are used in connection with the first communication circuit and some of the first quantity of equal bandwidth communication pathways are used in connection with the second communication circuit.

47. The method according to claim 45 wherein the first communication circuit is a DS3 circuit.

48. The method according to claim 45 wherein the first and second communication circuits are DS3 circuits.

* * * * *